United States Patent
Kennedy et al.

(10) Patent No.: US 7,684,557 B2
(45) Date of Patent: *Mar. 23, 2010

(54) SYSTEM AND METHOD OF DELIVERING DSL SERVICES

(75) Inventors: Bryan K. Kennedy, Chamblee, GA (US); Richard Wolf, Marlton, NJ (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/218,977

(22) Filed: Jul. 16, 2008

(65) Prior Publication Data

US 2009/0086960 A1 Apr. 2, 2009

Related U.S. Application Data

(63) Continuation of application No. 11/601,455, filed on Nov. 17, 2006, now Pat. No. 7,412,052, which is a continuation of application No. 10/301,960, filed on Nov. 22, 2002, now Pat. No. 7,155,004.

(51) Int. Cl.
*H04J 1/08* (2006.01)
*H04M 3/22* (2006.01)
*H04M 3/42* (2006.01)
*H01R 9/24* (2006.01)
*H01R 29/00* (2006.01)

(52) U.S. Cl. .................. 379/327; 370/485; 370/493; 379/16; 379/22.04; 379/201.12; 379/399.01; 439/188; 439/676; 439/709

(58) Field of Classification Search .............. 370/464, 370/480, 485, 493; 379/15.01, 16, 22.04, 379/27.01, 201.12, 325, 326, 327, 399.01; 439/188, 676, 709, 922
See application file for complete search history.

(56) References Cited

U.S. PATENT DOCUMENTS

| | | | |
|---|---|---|---|
| 4,547,034 A | 10/1985 | Forberg et al. |
| 4,846,735 A | 7/1989 | Teichler et al. |
| 4,871,330 A | 10/1989 | Muller et al. |
| 5,033,974 A | 7/1991 | Biederstedt et al. |
| 5,157,580 A | 10/1992 | Hegner et al. |
| 5,163,855 A | 11/1992 | Gerke et al. |
| 5,410,443 A | 4/1995 | Pelegris |
| 5,455,856 A | 10/1995 | Story |
| 5,494,461 A | 2/1996 | Bippus et al. |
| 5,551,889 A | 9/1996 | Kozel et al. |
| 5,574,614 A | 11/1996 | Busse et al. |
| 5,641,312 A | 6/1997 | Bippus et al. |
| 5,999,412 A | 12/1999 | Busse et al. |
| 6,068,503 A | 5/2000 | Gerke et al. |

(Continued)

OTHER PUBLICATIONS

Methods of ADSL delivery, KRONE, 2 pages (Publicly known prior to the filing date of the present application).

*Primary Examiner*—Harry S Hong
(74) *Attorney, Agent, or Firm*—Merchant & Gould P.C.

(57) ABSTRACT

A system and method for delivering digital subscriber line (DSL) service to a subscriber from a remote terminal of a telephone network. Included is a first route for delivering a telephone signal to the subscriber, and a second route for passing the telephone signal through a DSL system before delivering the signal to the subscriber. A disrupter is then used to selectively activate either the first or second route.

7 Claims, 5 Drawing Sheets

U.S. PATENT DOCUMENTS

| | | | |
|---|---|---|---|
| 6,266,348 B1 | 7/2001 | Gross et al. |
| 6,371,780 B1 | 4/2002 | Aponte et al. |
| 6,426,961 B1 | 7/2002 | Nimmagadda |
| 6,470,074 B2 | 10/2002 | Teixeria |
| 6,574,309 B1 | 6/2003 | Chea et al. |
| 6,603,850 B1 | 8/2003 | Stahl et al. |
| 6,657,966 B1 | 12/2003 | Kramarczyk et al. |
| 6,735,293 B2 | 5/2004 | Doherty et al. |
| 6,778,525 B1 | 8/2004 | Baum et al. |
| 6,785,325 B1 | 8/2004 | Liu et al. |
| 6,798,866 B1 | 9/2004 | Tennyson et al. |
| 6,826,280 B1 | 11/2004 | Sajadi et al. |
| 6,898,280 B1 | 5/2005 | Dombkowski et al. |
| 6,914,976 B2 | 7/2005 | Bloemen |
| 6,977,922 B2 | 12/2005 | Blanset et al. |
| 6,980,725 B1 | 12/2005 | Swieconek |
| 7,155,004 B1 | 12/2006 | Kennedy et al. |
| 7,409,053 B1 | 8/2008 | Kennedy et al. |
| 7,412,052 B2 | 8/2008 | Kennedy et al. |
| 2002/0111077 A1 | 8/2002 | Keenum |
| 2002/0118820 A1 | 8/2002 | Sinclair et al. |
| 2002/0168054 A1 | 11/2002 | Klos et al. |
| 2004/0042510 A1 | 3/2004 | Bremer et al. |
| 2004/0095956 A1 | 5/2004 | Henderson et al. |
| 2004/0259396 A1 | 12/2004 | Mueller et al. |

SYSTEM AND METHOD OF DELIVERING DSL SERVICES

CROSS-REFERENCE TO RELATED APPLICATIONS

This application is a continuation of application Ser. No. 11/601,455, filed Nov. 17, 2006 now U.S. Pat. No. 7,412,052; which is a continuation of application Ser. No. 10/301,960, filed Nov. 22, 2002, now U.S. Pat. No. 7,155,004; which applications are incorporated herein by reference.

FIELD OF THE INVENTION

The present invention relates generally to digital subscriber lines, and, more specifically, to a new method for delivering digital subscriber line service from a remote terminal of a telephone network.

BACKGROUND OF THE INVENTION

Digital subscriber line (DSL) technology allows for high-bandwidth networking connections to be made over ordinary copper telephone lines. Traditional phone service typically relies on unshielded twisted pair (UTP) copper lines to connect homes and small businesses to the communications network operated by the telephone company (TELCO). Every one of these networks includes a central offices (CO) that services a defined region, with each CO responsible for connecting and routing calls directed to sites that reside both internal to and external of the network Branching out from the central office are numerous remote terminals (RT) located throughout the region being served by the CO, with each RT providing the phone service for the subscribers located within a specific area or neighborhood. One of the primary components that make up a remote terminal (RT) is a pair gain system, also known as a derived carrier system, or digital loop carrier system. In simplest terms, the pair gain system provides the TELCO with the capability to carry multiple services over a lesser number of lines, for example, five conversations over one telephone line. The pair gain system also is responsible for generating the dial tone signal one hears when they first pick up a telephone handset, indicating that an active connection is present.

FIG. 1 depicts a typical telephone connection between a pair gain system 10 of a remote terminal (RT) (not shown) and a subscriber 30. As indicated in FIG. 1, the connection between the pair gain system 10 and subscriber 30 is not accomplished directly, but instead in two legs. The first connection 10a exists between the pair gain system 10 and a cross connect block 20, while the second connection 20a is made between the cross connect block 20 and a subscriber 30. As indicated by its name, the purpose of the cross connect block 20 is to allow easy matching and connecting of two or more connections to one another, thereby facilitating the addition or removal of phone services to or from the subscriber.

To further illustrate the use of a cross connect block 20, consider the following example involving a typical modern day residence. New homes are often pre-wired to handle multiple telephone lines, i.e. six lines, to allow for future expansion. In this situation, there would be six connections running between the subscriber's house 30 and the cross connect box 20. However, if the subscriber only has two active phone lines, then only two connections representing the active circuits would run from the pair gain system 10 to the cross connect box 20. Later, if the subscriber wishes to add a new telephone line for a fax machine, a technician would have to run a new connection between the pair gain system 10 and the cross connect block 20, matching the new connection at the cross connect block 20 to the appropriate connection already present that runs to subscriber's house 30.

Note that each of connections 10a and 20a, along with the connections discussed below, although drawn as single lines in the figures, actually represent a cable pair, such as, for example, typical unshielded twisted pair (UTP) copper lines. For the remainder of the application, the terms "connection" and "cable pair" should be considered interchangeable. In view of this, it should be further understood that terminals for receiving these connections, such as can be found on cross connect block 20, are comprised of two conductors, with each conductor receiving one cable of the cable pair.

FIG. 2 depicts the same connection as previously depicted in FIG. 1. However, unlike the previous depiction, FIG. 2 provides a more detailed illustration of cross connect block 22, which is illustrated as an insulation-displacement connection (IDC) block. Unlike blocks that rely on screw-terminals or a wire wrapping technique to secure wires to the block, IDC blocks provide for a gas-tight connection without requiring the removal of insulation covering the wire. Connection is achieved once a wire is placed into an IDC block contact, and then punched down, typically via an insertion tool, pressing the wire against the contact to form the gas-tight connection. Due to ease of use and effectiveness, cross connect blocks utilizing IDC contacts have become the standard within the telecommunications industry.

As DSL technology is relatively new compared to typical telephonic communication involving analog signals, many of the remote terminals (RT) that are part of a telephone company's (TELCOs) network were not designed to allow easy incorporation of newer technology such as DSL. Accordingly, the TELCOs have had to develop ways to effectively provide DSL service to their subscribers utilizing the existing equipment on the network.

FIG. 3 depicts a typical approach to incorporating DSL service with a remote terminal (RT). The dial tone signal generated by the pair gain system 10 is directed to a splitter 50 via connection 10a. Splitter 50 also receives a connection 40a from a DSL system 40. DSL system 40 includes the equipment necessary for processing and directing the data signals back and forth between subscriber 30 and a digital subscriber line access multiplexer (DSLAM) (not shown). The DSLAM, which is operated by a service provider, takes all of the subscribers' DSL connections and aggregates them onto a single, high-density connection to the Internet. For the current illustrative example involving the integration of DSL at an RT, the DSL system may be physically mounted inside the cabinet housing the RT, or placed in its own cabinet mounted onto or next to the RT depending on factors such as size limitations and ease of access.

The role of splitter 50 is to combine the lower frequency signal from the pair gain system 10 with the higher frequency DSL data signal in such a way that they don't interfere with one another. Similarly, splitter 50 must also be capable of separating the signal sent by the subscriber 30 back into its two constituent components and then direct them back to the appropriate system. In FIG. 3, splitter 50 is depicted as an independent component separate from DSL system 40. Alternatively, splitter 50 may be incorporated into DSL system 40.

The combined signal produced by splitter 50 is delivered to cross connect block 20 over connection 50a, where it is then directed to subscriber 30 over connection 20a. Subscribers 30 can then access the higher frequency DSL signal by means of a DSL modem connected between their computing device and the telephone line(s) running throughout their residence. At the same time, standard telephones continue to have access to the lower frequency analog signals also routed over the line(s).

To accomplish the arrangement illustrated in FIG. 3, a service technician is required to go onsite and perform wiring locally at the remote terminal (RT) that is servicing the subscriber. In order to combine the signal coming from the pair gain system 10 with the DSL data signal, the pair gain system 10 that normally is directly wired to cross connect block 20 must now be rerouted so that it interfaces with splitter 50. At splitter 50, the signal from the pair gain system 10 is combined with the DSL data signal, which also runs through splitter 50. The combined dial tone and DSL signal must then be placed back into communication with subscriber 30, requiring a new connection between splitter 50 and cross connect block 20. Due to these re-wiring requirements, the telephone service of subscriber 30 is disrupted; preventing them from making or receiving any telephone calls. Further, the duration of this disruption can vary depending on the knowledge and skill of the service technician, along with the condition of the RT.

If a DSL subscriber decides he or she no longer wants DSL service, the service technician must access the remote terminal (RT) again and disrupt the connection 40a that provides communication between the DSL system 40 and splitter 50. The splitter 50 must also be removed from the system, once again disrupting the subscriber's telephone service. Additionally, during the process of reconnecting pair gain system 10 back to cross connect block 20, there is always the chance that a mistake could be made, resulting in an improper connection to exist. This can lead to subscriber 30 going without telephone service for an extended duration until the problem can be corrected.

SUMMARY OF THE INVENTION

The present invention relates to a new system and method of delivering digital subscriber line (DSL) service to a subscriber. A first route for communicates a pair gain signal from a pair gain system, through a cross connect block, to the subscriber. A second route, which partially overlaps the first route, communicates the pair gain signal from the pair gain system, through a DSL system, to the subscriber. A disrupter is then used to selectively activate one of the first and second routes.

DESCRIPTION OF THE PREFERRED EMBODIMENT

Figure 1:
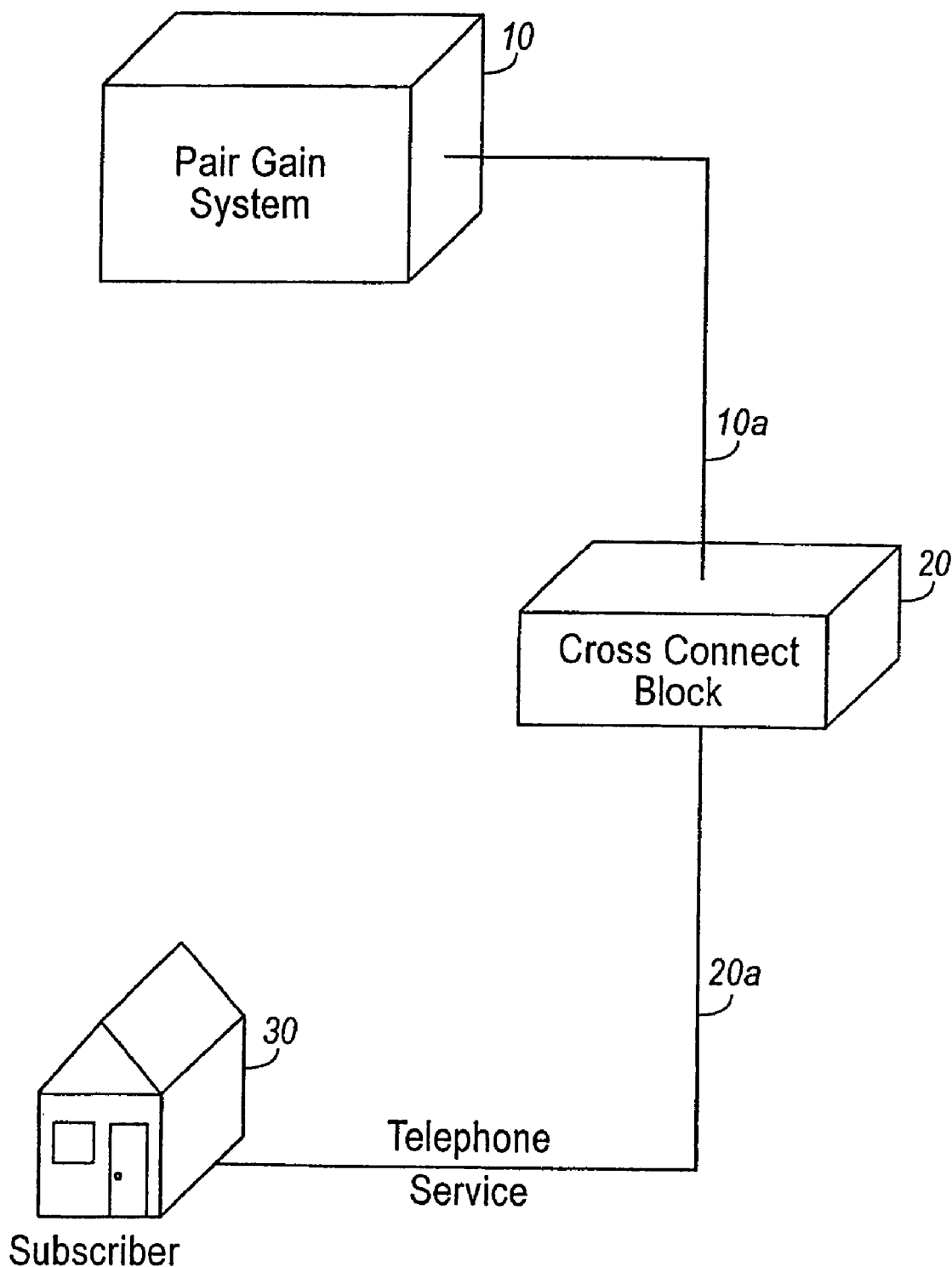
FIG. 1 is a simplified depiction of a typical neighborhood setup for distributing telephonic communication service to a subscriber.
Figure 2:
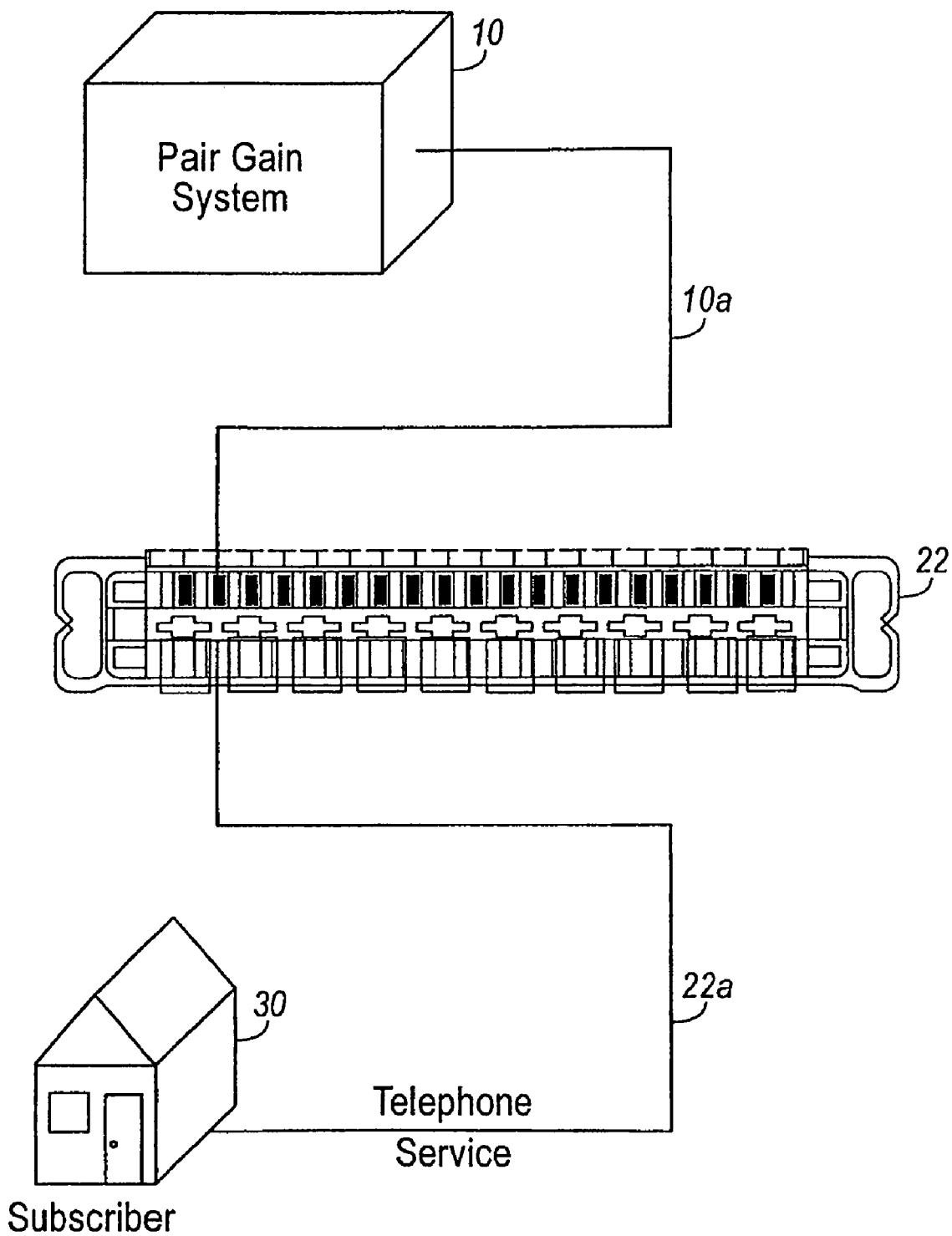
FIG. 2 is equivalent to FIG. 1, but with the cross connectivity block shown in further detail.
Figure 3:
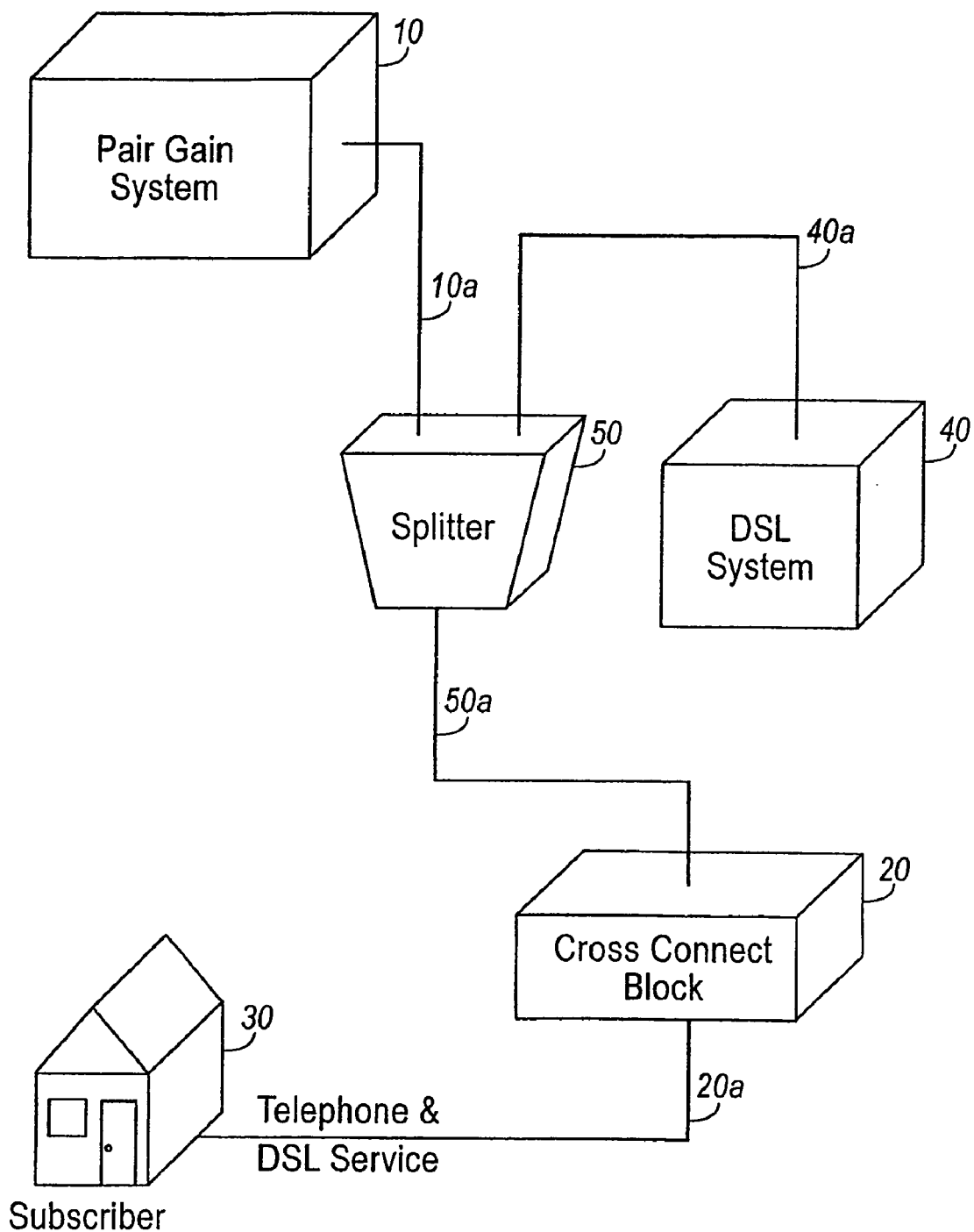
FIG. 3 is a simplified depiction of a typical setup for distributing telephonic communication service along with digital subscriber line data service to a subscriber.

One embodiment of the present invention will now be discussed in reference to FIG. 4. Like the basic distribution setup depicted in FIG. 1, the pair gain system 10 of FIG. 4 connects to cross connect block 20 by connection 10a, while the cross connect block 20 connects to subscriber 30 by connection 20a. Through these two connections, subscriber 30 is provided with telephone service.

In order to provide DSL service to subscriber 30, a service technician accesses the cross connect block 20 that serves subscriber 30 and reroutes the telephone signal of subscriber 30 so as to combine it with a DSL signal. However, unlike prior methods of accomplishing this, according to the present embodiment the technician maintains connections 10a and 20a, thereby allowing phone service to subscriber 30 to continue during the installation of DSL service.

Instead of rewiring connection 10a, a new connection 20b is made between the cross connect block 20 and splitter 50, with connection 20b attaching to block 20 at the same terminal that receives connection 10a. This places connection 10a in communication with connection 20b so that signals traveling through one will proceed to the other. An example of a cross connect block 20 with this "double terminate" feature, where more than one connection can be established to the same terminal on the block, are the Series 2 Connecting Blocks made by Krone. A connection 40a between splitter 50 and the DSL system 40 is also established. Lastly, a connection 50a, which will carry the combined dial tone/DSL signal, is made between splitter 50 and cross connect block 20. Similar to connection 20b, connection 50a is attached to block 20 at the same terminal that attaches to connection 20a, so that these two connections are placed in communication with one another. During this entire process, the signal path made up of connection 10a, cross connect block 20 and connection 20a remains undisturbed. As such, telephone service to subscriber 30 is never disrupted.

In order to "turn on" the DSL service for subscriber 30, the service technician then modifies cross connect block 20 so as to disrupt the signal path running through block 20. As passage through the cross connect block 20 is no longer possible, the signal generated by pair gain system 10 proceeds to be redirected over connection 20b into the splitter 50, where it is combined with the DSL signal carried by 40a. The combined signal is then carried over connection 50a and connection 20a to subscriber 30, who never notices a disruption in his or her telephone service while DSL service was activated.

Figure 4:
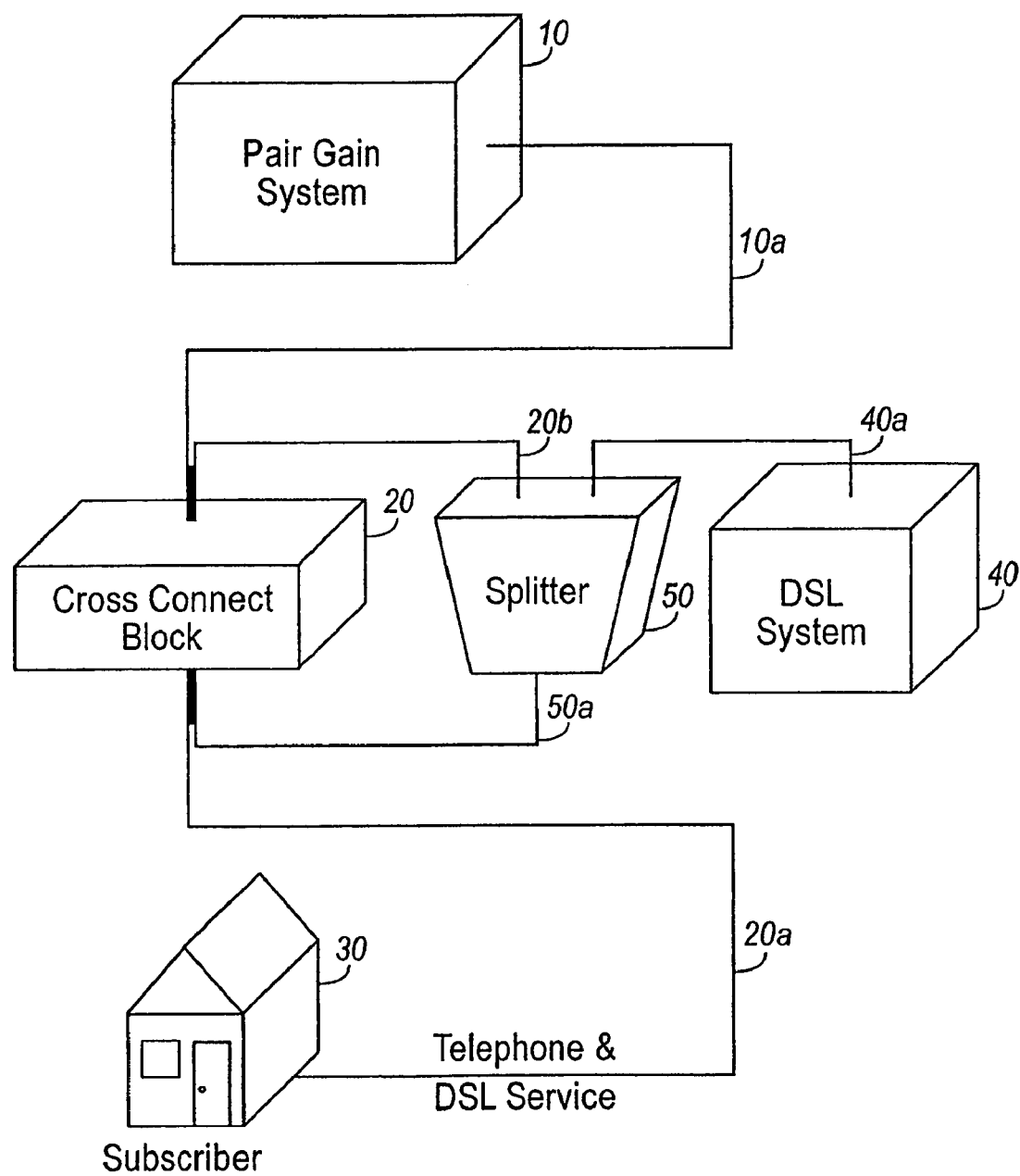
FIG. 4 is a simplified depiction of a setup in accordance with one embodiment of the present invention for distributing telephonic communication service along with digital subscriber line data service to a subscriber.
Figure 5:
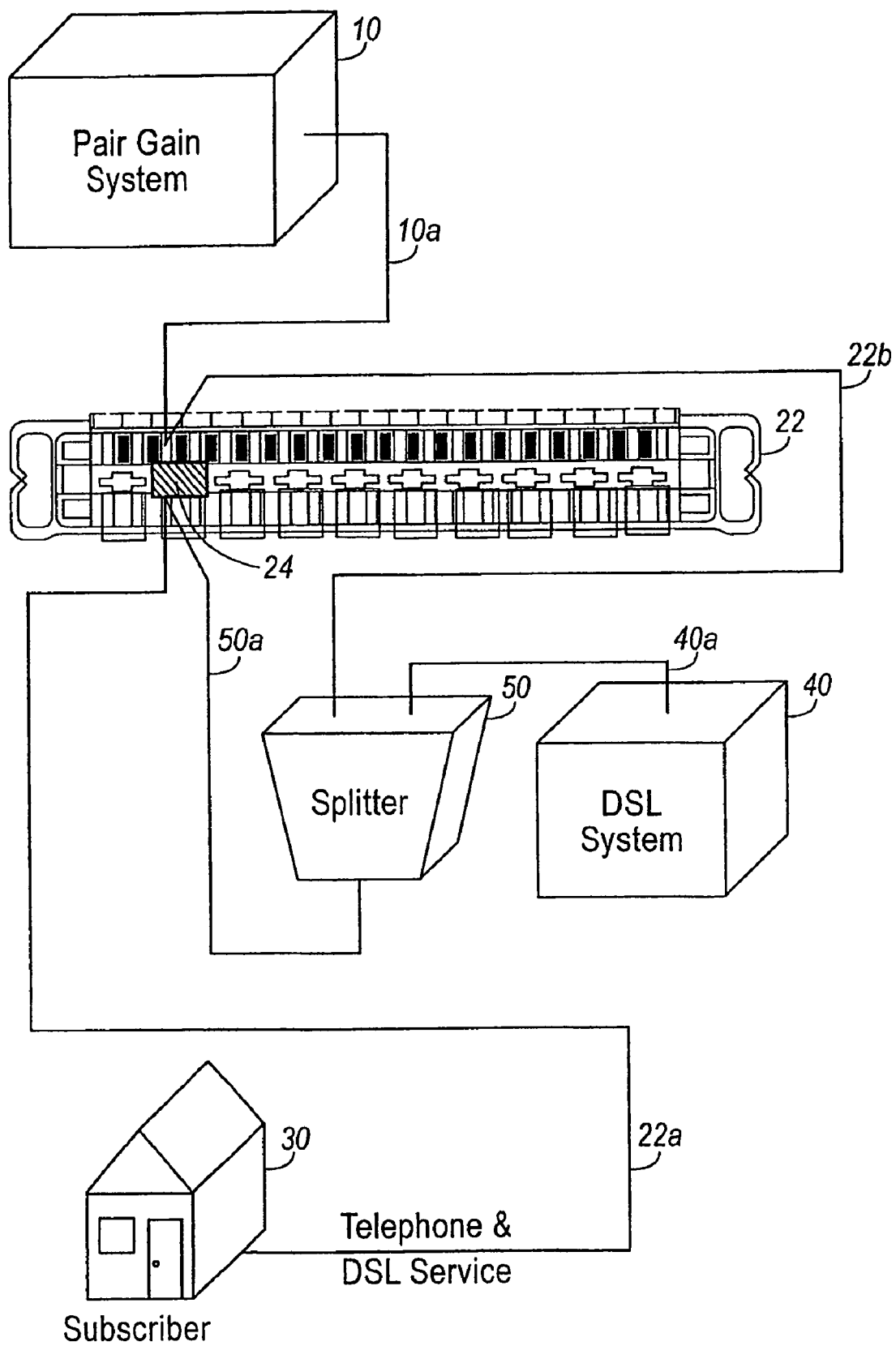
FIG. 5 is an additional simplified depiction of a setup in accordance with one embodiment of the present invention for distributing telephonic communication service along with digital subscriber line data service to a subscriber.

FIG. 5 depicts the same circuit as previously depicted in FIG. 4 with the exception that cross connect block 20 is now illustrated as an IDC cross connect block 22. As before, the service technician establishes connections 22b and 50a, which effectively adds DSL system 40 and splitter 50 in parallel to the IDC block 22. To then activate DSL service to the subscriber, the technician inserts a disconnect plug 24 designed to be received by IDC block 22. Upon its insertion, disconnect block 24 effectively disrupts or opens the signal path that previously allowed the signal from pair gain system 20 to "cut through" the cross connect block. As a result, the signal is rerouted to splitter 50 as before, thereby activating DSL service to subscriber 30 without providing any noticeable disruption in telephone service.

If subscriber 30 desires to deactivate his or her DSL service, the service technician simply repeats the process in reverse. Specifically, disconnect plug 24 is removed from IDC block 22. With plug 24 absent, the signal path through the block is once again established and the signal from pair gain system 10 takes the direct path consisting of connections 10a and 22a, instead of being redirected through splitter 50. Connections 22b and 50a can then be removed safely. As during the DSL installation stage, subscriber 30 notices no disruption in their telephone service while the DSL service is being uninstalled.

Additionally, unlike prior DSL installation methods, according to the current embodiment, connection 10a between the pair gain system 10 and IDC connect block 22 and connection 22a between IDC connect block 22 and subscriber 30 is never disrupted or removed. As a result, there is no chance of a misappropriate connection being made by the technician upon removal of DSL service, thereby significantly reducing the chances that a subscriber will have to go without telephone service due to technician error.

The DSL delivery system and method described in the above embodiments is also advantageous as it provides the technician a good opportunity to check the condition of the subscriber's line. For example, just prior to disrupting the signal path through the cross connect block by insertion of the disconnect plug, the technician can instead insert a test cord in place of the disconnect plug. This then allows the technician to "look both ways" along the line to detect signs of possible problems that could affect either telephone or DSL service.

In the above discussion, Applicant's new method and system for delivering DSL is described, for illustrative purposes, in relation to a remote terminal (RT) servicing a specific area or neighborhood of subscribers. However, the new system and method is not limited to integrating signals at or near an RT, but can also be used at various other locations within the network. For example, the new system and method could be advantageously used in a controlled environment vault (CEV) utilized by TELCOs to house underground remote terminals and other networking equipment. Alternatively, the invention as presented in the embodiments above may also be beneficially used at a central office (CO) of the TELCO.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of establishing connections of an insulation displacement connection block for use in selective delivery of digital subscriber line service to a subscriber, the insulation displacement connection block including a plurality of double termination locations, the method comprising the steps of:
    a) establishing a first connection from a pair gain system at a first double termination location of the insulation displacement connection block;
    b) establishing a second connection from a splitter at the first double termination location;
    c) establishing a third connection from the subscriber at a second double termination location of the insulation displacement connection block;
    d) establishing a fourth connection from the splitter at the second double termination location; and
    e) selectively providing digital subscriber line service to the subscriber by:
        i) inserting a disconnector plug into an insertion location defined by the block, the insertion location corresponding to the first and second double termination locations, wherein the block delivers both a pair gain signal and a DSL signal to the subscriber; and
        ii) removing the disconnector plug from the insertion location, wherein the block delivers only a pair gain signal to the subscriber.

2. The method of claim 1, wherein a first signal pathway from the first double termination location of the block to the subscriber is established when the disconnector plug is removed from the insertion location, and wherein a second signal pathway from the first double termination location of the block to the subscriber is established when the disconnector plug is inserted into the insertion location.

3. The method of claim 2, wherein the second signal pathway communicates the pair gain signal from the pair gain system through the splitter to the subscriber.

4. The method of claim 2, wherein the disconnector plug diverts the pair gain signal away from the first signal pathway to the second signal pathway when inserted into the insertion location of the block.

5. The method of claim 1, wherein the step of inserting the disconnector plug includes disrupting a signal path running through the block between the first double termination location and the second double termination location.

6. The method of claim 1, wherein no noticeable disruption of the pair gain signal occurs during insertion or removal of the disconnection plug.

7. The method of claim 1, further including establishing connections at pairs of different double termination locations, each pair of different double termination locations defining one of a plurality of insertion locations of the insulation displacement connection block, the method further including selectively providing digital subscriber line service to different subscribers by inserting and removing disconnector plugs from the insertion locations.

* * * * *